Patented May 1, 1945

2,374,934

UNITED STATES PATENT OFFICE 2,374,934

PROCESS FOR PREPARING CAPILLARY ACTIVE SUBSTANCES

Winfrid Hentrich, Rodleben, near Dessau-Rosslau, and Erik Schirm and Heinz-Joachim Engelbrecht, Dessau, Germany; vested in the Alien Property Custodian No Drawing. Application March 26, 1941, Serial No. 385,298. In Germany February 23, 1940

15 Claims. (Cl. 260—401)

This invention relates to capillary active substances and to a process for their preparation. More particularly it relates to a process for preparing capillary active substances from sulfimides which have besides the imide group at least one group having at least one easily exchangeable hydrogen atom or metal atom respectively linked to a hetero atom or a hetero atom group and compounds, which have in the molecule besides a lipophile group an easily exchangeable halogen atom.

It is an object of this invention to provide the soap, laundry, textile, leather, fur, paper and the like industries with capillary active substances which are readily convertible into water soluble soap like salts and have excellent foaming, washing and cleaning properties.

In the co-pending application of Winfrid Hentrich and Erik Schirm filed August 3, 1939, Ser. No. 288,130, now Patent No. 2,292,997, there is described a process for preparing capillary active substances constituted according to the general formula R—SO₂—N(Kat)—SO₂R', wherein at least one of the two substituents R and R' stands for an organic radical containing at least one lipophile group, which may be interrupted by hetero atoms or hetero atom groups, whereas the other radical may be any hydrocarbon radical eventually interrupted by hetero atoms or hetero atom groups, and Kat denotes any desirable cation which is capable of forming water soluble salts. The process consists in condensing sulfonic acid halogenides of the general formula R—SO₂—Hal with sulfonic acid amides of the general formula R'—SO₂—NH₂ or its suitable metal derivatives respectively and in converting the obtained condensation products with inorganic or organic bases into water soluble salts.

In accordance with the present invention it has been found, that in cases, where the lipophile groups of the above denoted compounds are interrupted by hetero atoms or hetero atom groups, the synthesising of these groups is performed preferably after forming the sulfimide group (—SO₂—NH—SO₂—).

First those sulfimides are prepared which contain besides the imide group at least one group having at least one easily exchangeable hydrogen atom linked to a hetero atom or a hetero atom group, which in suitable cases may also be represented by a metal atom, and hereupon these sulfimides are condensed with compounds, having besides a lipophile group an easily exchangeable halogen atom.

According to the first step of this process organic sulfohalogenides and organic sulfamides or their metal compounds respectively or ammonia are condensed in accordance with known practice to form sulfimides. The sulfohalogenides and/or the sulfamides or their metal compounds respectively possess at least one group in the molecule with at least one easily exchangeable hydrogen atom linked to a hetero atom or a hetero atom group such as hydroxyl, mercapto, amino, sulfamino group and the like or their corresponding metal compounds respectively. If necesary instead of these groups the sulfohalogenides or sulfamides respectively may contain likewise such groups as nitro, azo, nitroso, acylamino, ester and the like groups which may be converted in the above named groups according to known practice. In this embodiment of the invention the groups having easily exchangeable hydrogen atoms are produced after the sulfimide condensation is performed.

According to the first step of the process e. g. the following sulfimides may be obtained m-hydroxy-benzene-p'-toluene-sulfimide, m,m'-dihydroxy-dibenzene-sulfimide, β-mercapto-ethane-benzene-sulfimide, p-mercapto-dibenzene-sulfimide, m-amino-benzene-p'-toluene-sulfimide, m,m'-diamino-dibenzene-sulfimide, the di-sodium salt of the methane-benzene-sulfimide-3-sulphonic acid, the 3-sulfamido-4,4'-dimethyl-dibenzene-sulfimide and the like.

As lipophile compounds having an easily exchangeable halogen atom in the molecule the following compounds may be named halogenalkyls such as butylchloride, hexylchloride, dodecylchloride, oleylchloride and the like, halogenides of fatty acids or naphthenic acids respectively such as butyric acid chloride, capronic acid chloride, capyrlic acid chloride, capric acid chloride, mixtures of fatty acid chlorides or mixtures of paraffin carboxylic acid chlorides and the like, chloro carbonic acid esters of higher molecular aliphatic or cycloaliphatic hydroxyl compounds as chloro carbonic acid butyl, -hexyl, -octyl, -dodecyl, -cyclohexyl, -methylcyclohexyl esters, halogenides of higher molecular alkyl sulfonic acids or alkyl aryl sulfonic acids as hexyl-, octyl-, dodecyl sulfochlorides or bromides, sec.-octylbenzene sulfochloride, sec.-dodecylbenzene sulfochloride, the resultant products of SO₂ and Cl₂ on aliphatic and aliphatic-aromatic hydrocarbons and the like, alkylated heterocyclic halogen compounds such as octylamino-, dodecyl-amino- or octadecylamino-cyanuric dichloride and the like and other known compounds of these classes.

The sulfimides obtained according to the first step of the instant process are condensed with the above denoted compounds with easily exchangeable halogen atoms, if necessary in the presence of an acid binding agent such as inorganic or organic bases or alkaline reacting inorganic salts respectively e. g. soda, soda lye, sodium acetate, calcium carbonate, pyridine and the like, preferably in the presence of an organic solvent such as acetone, butanol, benzene, toluene or in the presence of water.

*Example 1*

343 parts by weight of di-sodium salt of the methane-benzene-sulfimide-3-sulfonic acid (obtained by condensation of m-nitrobenzene-sulfochloride with methane-sulfamide, reduction of the nitro group to the amino group, diazotizing and conversion of the diazocompound with sulfurous acid), 260 parts by weight of cetyl chloride, 10 parts by weight of sodium iodide and 2000 parts by weight of butanol are boiled under reflux till the conversion is accomplished, which requires about 12 to 16 hours. The solvent is distilled off, the residue is extracted with benzine to eliminate any residue of cetyl chloride that may still be present and is recrystallized from water or from aqueous alcohol. One obtains in an output of approximately 90% a colorless powder of a good washing power which is soluble in warm water while foaming. The constitution formula of the compound is

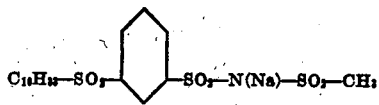

*Example 2*

250 parts by weight of m'-aminobenzene-methane-sulfimide, obtained as per Example 1 are dissolved in 1250 parts by weight of water under an addition of 40 parts by weight of sodium hydroxide. To this solution 200 parts by weight of a crystallised sodium acetate are added and the solution is cooled down to 2° C. Now at 2 to 5° 218 parts by weight of lauric acid chloride diluted with the same volume of acetone are stirred in within about one hour, whereupon one continues with stirring for a further hour while cooling with ice. Then one neutralizes the mixture at room-temperature with soda and warms up to 90-95° C., whereat the liquid is maintained neutral to slightly litmus alkaline if necessary by an addition of further amounts of soda. As soon as at 90 to 95° a clear solution is obtained, 175 parts by weight of sodium chloride are added and the mixture is cooled down to room-temperature. It results a precipitate which consists of the m'-lauroylaminobenzene-methane-sulfimide and which is filtered and dried. The output is nearly quantitative. The structural formula of the precipitate may be indicated as follows:

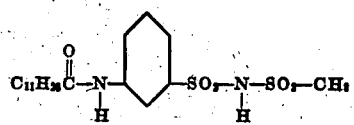

*Example 3*

350 parts by weight of the sodium salt of the m,m'-diamino-dibenzene-sulfimide, obtained by the condensation of 2 mols of m-nitrobenzene-sulfochloride and 1 mol of ammonia and by the reduction of the nitro group, are dissolved in 2000 parts of water. This solution is cooled down to 2° C., whereupon at 2-5° C. 425 parts by weight of octane sulfochloride diluted with the same volume of acetone are dropped in while vigorously stirring. Then the mixture is neutralized by a careful addition of soda lye while gradually raising the temperature as soon as the development of the acid begins to cease. Finally the reaction is made up at 90 to 95° C. to constantly slight litmus alkaline. Now the solution is neutralized with hydrochloric acid, then cooled down to room-temperature, whereupon the chief amount of the formed condensation product of the formula

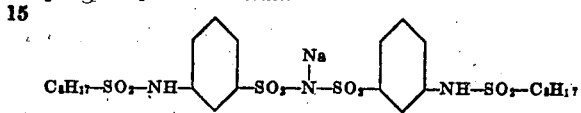

is filtered off. A little remainder may be obtained from the filtrate by saturating with sodium chloride. After drying and pulverizing a reddish powder is obtained which easily dissolves in water while foaming. This solution shows a good wetting effect.

*Example 4*

In a closed vessel with a stirring gear and a descending cooler 28 parts by weight of β-mercapto-ethane-benzene-sulfimide, obtained by the condensation of benzene-sulfochloride and β-chloroethane-sulfamide and conversion of the condensation product with alkali hydrosulfide, are dissolved in 100 parts of water under an addition of 8 parts by weight of sodium hydroxide. Into this solution at room-temperature a solution of 17 parts by weight of n-dodecyl-amino-cyanuric-dichloride in 50 parts by volume of acetone is stirred in and after a further stirring for half an hour the temperature is slowly raised till the acetone begins to boil. The acetone, which distills off, is replaced by the same volume of water. Finally the mixture is warmed up to 90-100° C. till no further mercapto compound is present, whereupon 50 parts by weight of sodium chloride are added and the mixture is cooled down to room-temperature. The condensation product which is separated in an amorphous state having the structure formula

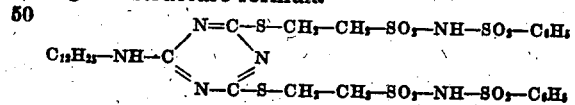

is now filtered off and dried. It easily dissolves in hot water while foaming.

*Example 5*

To a solution of 131 parts by weight of 3,3'-diamino-dibenzene sulfimide (obtained by condensing of two mols of 3-nitrobenzene-sulfochloride and one mol of ammonia and by reducing the nitro group in the obtained condensation product), 53 parts by weight of sodium hydroxide and 700 parts by weight of water are added gradually at 0-2° C. while stirring 135 parts by weight of caprylic acid chloride, which is dissolved in 100 parts by weight of benzene. The mixture is stirred for an hour while cooling with ice, after that the temperature is raised to room-temperature and finally to 50-60° C., whereupon the benzene is distilled off. The mixture is now cooled down and 50 parts by weight of concentrated hydrochloride acid are added. The thus formed precipitation is sucked off, recrystallized from methanol and dried at 100°. One obtains the 3,3'-di-(caproyl-aminobenzene)-disulfimide which forms a white crystalline mass and which is converted into the corresponding water soluble sodium salt by a treatment with soda lye. The aqueous solution of this salt possesses distinguished foaming and washing properties. The structural formula of the sodium salt may be indicated as follows:

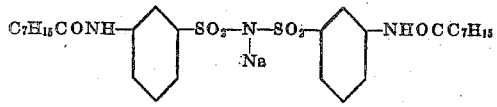

Example 6

To a suspension of 33 parts by weight of 3,3'-diamino-dibenzene-sulfimide, 30 parts by weight of pyridine and 200 parts by weight of toluene while stirring at 10-20° C. drop by drop 42 parts by weight of an organic acid chloride mixture are added, which is obtained by chlorinating a fraction of carboxylic acids (B. P.$_{13}$=125-160°, average molecular weight 158), produced by oxidizing paraffin. The mixture is stirred for some time at room temperature and is finally warmed up to 70°. After cooling down and separating the toluene by decanting, the precipitated mass is dissolved in a small amount of alcohol. To the alcoholic solution water is added and the mixture is made weakly alkaline by the addition of soda lye. The thus formed solution is evaporated in vacuo to dryness. One obtains a slight brownish powder in a nearly quantitative output, which is clearly soluble in water and which shows the same properties as the product of Example 5.

We claim:

1. As a new capillary active substance a water soluble salt of the condensation product of an amino substituted disulfimide and an organic acid halide having a lipophile hydrocarbon radical.

2. As a new capillary active substance the water soluble salt of the condensation product of a di(aminobenzenesulf)-imide and a carboxylic acid chloride containing a lipophile hydrocarbon radical.

3. As a new capillary active substance a water soluble salt of the condensation product of di(3-aminobenzenesulf)-imide and a higher fatty acid chloride.

4. As a new capillary active substance a water soluble salt of the condensation product of di(3-aminobenzenesulf)-imide and a mixture of fatty acid chlorides having 7-9 carbon atoms in the molecule.

5. As a new capillary active substance a water soluble salt of the condensation product of di(3-aminobenzenesulf)-imide and caprylic acid chloride.

6. As a new capillary active substance a water soluble salt of the condensation product of di(3-aminobenzenesulf)-imide and a sulfonic acid chloride containing a lipophile hydrocarbon radical.

7. As a new capillary active substance the sodium salt of the di(3-caproylaminobenzenesulf)-imide.

8. As a new capillary active substance the condensation product of a disulfimide containing in the molecule in addition to the imide group at least one group having an easily exchangeable hydrogen atom and an organic compound having a lipophile group and a reactive halogen atom.

9. As a new capillary active substance the water soluble salt of the condensation product of a disulfimide containing in the molecule in addition to the imide group at least one group having an easily exchangeable hydrogen atom and an organic compound having a lipophile group and a reactive halogen atom.

10. A process for preparing a capillary-active compound which comprises producing a disulfimide having in addition to the imide group a group containing an easily exchangeable atom selected from hydrogen and an alkaline reacting metal and then condensing said sulfimide with a compound containing a lipophile group and a reactive halogen atom.

11. A process for preparing a capillary-active compound which comprises producing a disulfimide having in addition to the imide group a group containing an easily exchangeable atom selected from hydrogen and an alkaline reacting metal, condensing said disulfimide with a compound containing a lipophile group and a reactive halogen atom, and further reacting with a basic material to form a water-soluble salt of the disulfimide.

12. A process for preparing a capillary-active compound which comprises condensing an organic sulfohalide containing an easily exchangeable hydrogen atom with an organic sulfamides to form a disulfimide, and then condensing said disulfimide with a compound containing a lipophile group and a reactive halogen atom.

13. A process for preparing a capillary-active compound which comprises condensing an organic sulfohalide and an organic sulfamide containing an easily exchangeable hydrogen atom in addition to the sulfamide hydrogen atoms to form a disulfimide, and further condensing said disulfimide with a compound containing a lipophile group and a reactive halogen atom.

14. A process for producing a capillary-active compound which comprises condensing a disulfimide containing a readily replaceable hydrogen atom in addition to the imide hydrogen atom with a compound containing a lipophile hydrocarbon group and a reactive halogen atom.

15. A new compound, the condensation product of a disulfimide containing a group having an easily exchangeable hydrogen atom in addition to the imide group with an organic compound having a lipophile hydrocarbon radical and a reactive halogen atom.

WINFRID HENTRICH.
ERIK SCHIRM.
HEINZ-JOACHIM ENGELBRECHT.